Patented Nov. 2, 1937

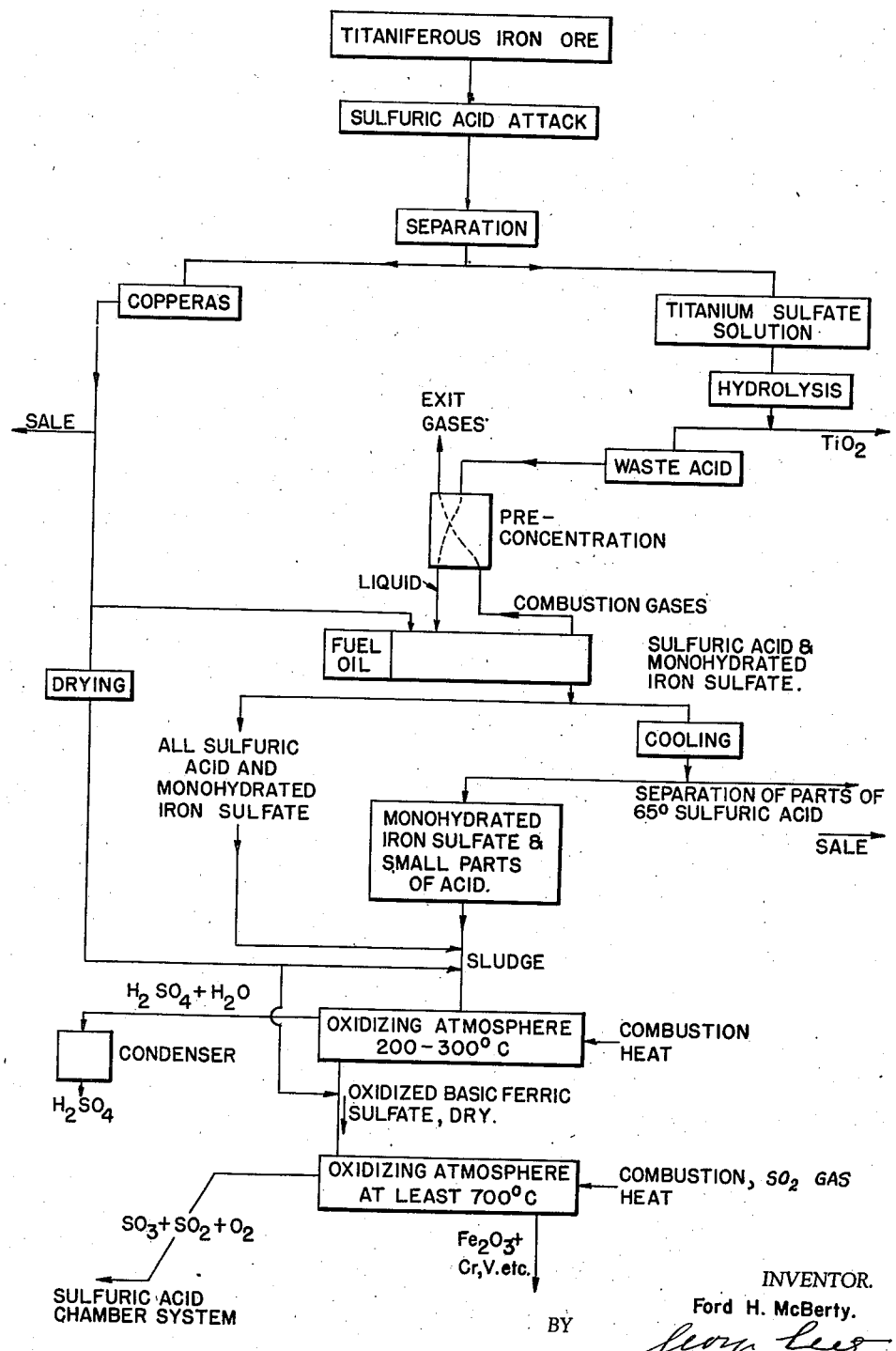

2,098,056

UNITED STATES PATENT OFFICE 2,098,056

UTILIZATION OF WASTE PRODUCTS IN THE MANUFACTURE OF TITANIUM COMPOUNDS FROM TITANIUM ORES

Ford H. McBerty, Newark, Del., assignor to E. I. du Pont de Nemours & Co., Wilmington, Del., a corporation of Delaware Application February 15, 1936, Serial No. 64,065

5 Claims. (Cl. 23—172)

The present invention comprises a process according to which byproducts obtained in the manufacture of titanium compounds from titaniferous-iron ores can be made use of; such byproducts are iron sulfate and dilute sulfuric acid and the invention deals particularly with the inter-relation and co-ordination of various operations and process steps whereby valuable products are recovered from such byproducts with the least expenditure of mechanical and thermal energy. These operations are so combined as to enable variations in the individual steps without fundamentally changing the whole sequence of operations, whereby it becomes possible so to regulate the amounts and types of such products as to adapt the process to changing economic conditions.

In its broadest embodiment the novel process of my invention comprises the following steps:

1. Pre-concentration of the waste sulfuric acid recovered from the hydrolysis of a titanium sulfate solution.

2. This pre-concentrated sulfuric acid, to which part or all of the recovered copperas is added, is further concentrated to the point where mono hydrated iron sulfate crystallizes out of the solution. At this point a relatively concentrated and not very pure sulfuric acid is optionally separated from a mixture of free sulfuric acid and iron sulfate.

3. The mixture of free sulfuric acid and iron sulfate is then heated so as to distill aqueous sulfuric acid from the mixture and to oxidize the ferrous sulfate.

4. The residue of oxidized iron sulfate is then heated further in an oxidizing atmosphere whereby sulfur gases, namely, $SO_2$ and $SO_3$, are recovered and the mixture led into a sulfuric acid chamber system for the recovery of sulfuric acid therefrom.

The attached figure represents in a schematic manner the fundamental outline of my novel process.

In the most commonly used process for producing titanium compounds, such as for instance pigment $TiO_2$, one attacks a titanium-iron ore, such as ilmenite, with an excess of strong sulfuric acid, whereby an aqueous solution containing titanium and iron sulfates is obtained. The iron in solution is then reduced to the ferrous state and, on cooling, a large amount of ferrous sulfate in the form of copperas is crystallized out. The remaining titanium sulfate solution, containing small amounts of iron and other impurities, such as vanadium and chromium compounds originating in the ore, is further treated and the solution finally hydrolyzed whereby a hydrated, more or less acid titanium dioxide is precipitated. The mother liquor from this titanium oxide consists of a relatively dilute sulfuric acid of between, for instance, from 10 to 30% $H_2SO_4$, which contains substantial amounts of iron, some titanium and most of the other soluble impurities originally contained in the ore.

The two byproducts of such a process consist therefore of (1) a very impure and dilute sulfuric acid, and (2) copperas.

Up to the present time it has been impossible to make any economic use of these byproducts as the amounts, for instance, of copperas produced in addition to amounts produced as byproducts in other processes, for instance, in the pickling of steel, are far in excess of consumption and there is practically no utilization for a sulfuric acid of the dilution and impurity such as is recovered as the waste acid from the hydrolysis of a titanium sulfate solution. These byproducts have, therefore, been an industrial nuisance and all processes by which these byproducts have so far been treated have only resulted in abating this nuisance at great cost without creating any economical recoveries.

In its more detailed aspects my invention comprises the following operations:

1. The dilute waste acid obtained in the hydrolysis of a titanium sulfate solution is concentrated to the point where it becomes saturated with iron sulfate while near its boiling point, water being distilled off in this step. The impurities contained in the dilute solution still remain in the solution at the end of this step. The acid obtained in this pre-concentration remains free flowing and the operation is preferably conducted in a vertical tower with countercurrent flow of liquid and heating gas. The heating gases in this step are the spent gases from the second operation and the spent gases consisting of water vapor and combustion gases from this first step are wasted to the atmosphere.

The pre-concentrated acid at the end of this step has approximately the composition 30 to 40% $H_2SO_4$ and 12 to 20% $FeSO_4$.

2. The pre-concentrated solution of copperas in sulfuric acid is then heated further until the copperas in solution is dehydrated to form mono hydrated iron sulfate, but not to the point that sulfuric acid starts to distill off.

This second step is a very convenient point to adjust the process to changing economic conditions. It is, for instance, very advantageous at this point to introduce into the pre-concentrated waste acid part or all of the copperas originally separated from the titanium sulfate liquor before hydrolysis. This will then, together with the rest of the iron sulfate in the solution, dehydrate to the mono hydrate stage.

The heat required in this dehydration stage is furnished by the combustion of a carbonaceous fuel which travels concurrent with the acid to be heated, dehydrated and concentrated. The exit gases from this second step are used for the pre-concentration in the first step. The most convenient type of apparatus for this second step consists, for instance, of a brick-lined rotary kiln preceded by a combustion chamber in which powdered fuel or oil is burned. This step is also conveniently performed in a vacuum evaporator of the so-called "Mantius" type.

The acid at the end of this step has a concentration of from 65 to 80% $H_2SO_4$ and substantial amounts of mono hydrated iron sulfate have crystallized out.

The end of this step offers another very convenient point for adjusting the conditions of my process for changing economic conditions. If there is a demand for cheap, even if more or less impure sulfuric acid, I can cool the relatively concentrated acid obtained at the end of this concentration whereby substantial amounts of iron sulfate and most of the other impurities crystallize out. These insolubles can then be separated, leaving a relatively concentrated acid which is pure enough for many technical uses.

When none or only part of the free sulfuric acid is to be filtered off from crystallized mono hydrated iron sulfate, it is advisable to join with the waste acid before concentration as much of the original copperas from the titanium sulfate solution as had not been utilized.

It has previously been proposed to concentrate waste acid from the hydrolysis of titanium sulfate solutions to about 90% or stronger, whereby it is claimed all impurities contained in the original ore have become insoluble by heating to about 300° C. and a fairly pure sulfuric acid can then be filtered off.

It was found that it is entirely unnecessary in this second step to concentrate the waste acid to such a high strength, particularly when large amounts of copperas have been dissolved in the waste acid. As a matter of fact concentration of the acid to such high strength is always accompanied with losses as is well known in the art of sulfuric acid concentration and a decided economic loss occurs if this second step is carried too far. On the other hand, no practical losses of acid occur if the concentration is carried out less far and I obtain nevertheless a far going purification. When the concentration of the waste acid (without or preferably with additional amount of iron sulfate dissolved) is carried out to about 65% $H_2SO_4$, the precipitated mono hydrated iron sulfate entrains with it about 50% of the chromium and 70 to 75% of the vanadium impurities contained in the waste acid.

If the concentration is carried out further than to a 65% strength, the diminishing amounts of liquid acid remaining with the iron sulfate form such a thick sludge and of such a physical consistency that less and less liquid acid can be separated by filtration. Depending, therefore, upon the amount of liquid acid desired, one will have to regulate the amount of concentration. When the concentration is carried out to about 80% strength, it is practically impossible physically to separate the free acid from the iron sulfate, and a heavy sludge is obtained which is directly carried on to step 3.

An acid of the type obtained by filtration at this point has many technical uses, one of which is for admixture with fuming sulfuric acid to produce an acid of the desired concentration for the attack of titaniferous-iron ores. Some 20 to 30% of the original free acid in the waste treated concentrated in this manner remains with the residue and I, therefore, prefer to treat this residue in the next step No. 3 of my process. It will be understood that I do not have to separate all or part of the iron sulfate and impurities which crystallize out in the second step of my process, and when I have no use for such an acid I can, without separating the insoluble, continue my process directly. It will, however, be understood that the volatile material separated in this second step is obtained and handled entirely separately from the gaseous or volatile products obtained in the subsequent steps.

3. The mixture of mono hydrated iron sulfate with whatever free sulfuric acid is left with it is then heated to distill off all free sulfuric acid; care is taken to maintain the temperature in this step at not over 300° C. It is also advisable to maintain a lower temperature as long as large amounts of free sulfuric acid is present and the iron sulfate is incompletely oxidized, as at or above 300° C., strong sulfuric acid reacts with ferrous sulfate to form ferric sulfate and $SO_2$. This operation is again preferably carried out in a brick-lined or otherwise acid resistant rotary furnace. The distilling sulfuric acid is condensed in a usual type of cooler. Very little chemical decomposition of the sulfuric acid takes place in this step. Some mist formation and physical entrainment of sulfuric acid occur but such acid can easily be recovered by well-known means.

Step No. 3 is carried out by heating the acid to be distilled in an oxidizing atmosphere so that the iron sulfate obtained is extensively oxidized to the trivalent state, this oxidizing condition greatly minimizing decomposition of the iron sulfates at a relatively low temperature.

The sulfuric acid recovered in this step is of a concentration of 65 to 80% and is relatively pure. It can be used for any desired purpose; it can, for instance, be utilized for make-up acid and for circulation in a chamber system as will be required in the subsequent step.

The heat for this step is provided by combustion gases. When a carbonaceous fuel is employed, the combustion gases may be circulated out of contact with the sludge of iron sulfate and sulfuric acid treated, and the exit gases can be utilized for their excess thermic values but are otherwise allowed to waste; air, preferably preheated, is then led directly through the acid sludge.

A very convenient manner of providing for the calories required in this step is to burn a sulfur fuel, namely, elemental sulfur or a sulfid ore with an excess of oxygen. The $SO_2$ gases produced are then led directly into contact with the iron sulfate sludge, and after condensation of the distilled sulfuric acid, the exit sulfur gases are led into a chamber sulfuric acid plant.

If it is not found practicable to add the originally separated copperas to the above step No. 2, I can dehydrate this copperas to a point where it is transformed into mono hydrated iron sulfate and then add this to operation No. 3 or 4.

The solid residue of this third step consists of a more or less basic ferric sulfate.

4. This oxidized basic ferric sulfate is then transferred into another, preferably rotary furnace in which the product is heated to a temperature of at least 700° C. Here again it is essential to maintain a strong oxidizing atmosphere because oxygen in the presence of ferric oxide tends to increase the amount of $SO_3$ in the equilibrium between $SO_3$ and $SO_2$ and $O_2$.

Here again the heat is furnished by combustion gases traveling in direct contact with the iron sulfate, preferably in countercurrent. It is also possible either separately to burn elemental sulfur or to roast a sulfid ore, such as, for instance, pyrites, and pass the hot $SO_2$ gases with excess oxygen over the iron sulfate, or more conveniently, mix the solid basic iron sulfate with, for instance, pyrites and roast the mixture in any desired mechanical shaft furnace. Rotary furnaces which are so difficult to handle for the roasting of iron pyrites can very conveniently be employed in the present instance, as the large amounts of iron sulfate mixed in with the pyrites prevent excess temperature rise and the charge remains pulverulent without sintering and a very good desulfurization is obtained in this manner.

The gases from this step contain substantial amounts of $SO_3$, the amounts of $SO_2$ depend naturally upon the fuel used in this step. As obtained from the use of a carbonaceous or a sulfur fuel, the gases are not well adapted for use in a contact sulfuric acid plant as the large amounts of $SO_3$ and iron dust in the gases decidedly interfere with the life of the catalyst unless it were possible first to eliminate such $SO_3$ and dust. It is, therefore, desirable to take the gases from this step and convert them in a chamber sulfuric acid plant into commercial sulfuric acid. The highly heated acid flue dust which is possibly entrained with the sulfur gases from this step is practically insoluble in the acid and is easily eliminated as mud from the chamber acid.

The residue from this operation consists of a reddish-brown iron oxide which can be used for pigment purposes. This residue contains the vanadium and chromium values of the orignal titaniferous ore, which values can be recovered by chemical means.

In a particular instance a weak solution, containing 25% $H_2SO_4$ and about 11% $FeSO_4$, was concentrated in a vertical tower with counter-current flow of exit gases from step 2 to a strength of 32% $H_2SO_4$ and 14% $FeSO_4$. The acid discharged from this step of the operation was then concentrated in step 2 to 65% $H_2SO_4$ by heating up to 153° C., from which the greater portion of iron sulfate separated as iron sulfate mono hydrate. This material was cooled and filtered. The resulting filtrate analyzed 65% sulfuric acid with small amounts of dissolved iron and other metallic compounds.

The filtrate represented 65% of a total free acid of concentrated nature, the remaining 35% remaining with the iron sulfate mono hydrate of the filter cake. The ferrous sulfate mono hydrate filter cake containing free acid was charged into a direct fired rotary kiln and the free sulfuric acid content distilled off and subsequently condensed, allowing the combustion gases to exit to the atmosphere. The temperature was obtained by burning a low grade fuel oil, and passing the combustion gases in direct contact with the acid sludge in such a manner that the temperature of the sludge was not raised above about 300° C.

In this operation 95% of the free sulfuric acid was vaporized, and sulfuric acid of 65% strength was recovered.

Care was taken to have an oxidizing flame to prevent reduction of the sulfuric acid to $SO_2$.

The oxidized iron sulfate from the previous step was further treated in a direct-fired rotary kiln to a temperature of at least 700° C., in which kiln an oxidizing atmosphere was maintained and a $SO_3$—$SO_2$ mixture was produced which could be recovered in a chamber sulfuric acid plant, the sulfur gas obtained containing 8 to 9% total $SO_3$—$SO_2$, about 75% of which was $SO_3$.

I claim:

1. In a process of recovering valuable products from byproducts obtained in the manufacture of titanium compounds from titanium iron ores, which byproducts comprise a waste dilute impure sulfuric acid containing iron compounds and crystallized copperas, the steps of first concentrating said waste acid in countercurrent relationship with hot combustion gases to form a liquid acid heavily laden with iron sulfate; secondly, concentrating said acid further to the point where its iron sulfate in solution becomes dehydrated to the mono hydrated iron sulfate state, and iron sulfate crystallizes out of solution; thirdly, heating a so-obtained mixture of sulfuric acid and mono hydrated iron sulfate in an oxidizing atmosphere to a temperature of not exceeding about 300° C., recovering thereby a distilled sulfuric acid and a solid oxidized iron sulfate, increasing the iron content of said acid being treated by adding to it prior to Step 4 copperas recovered originally as the other byproduct; and as the fourth step, heating said oxidized iron sulfate to a temperature of at least 700° C. in an oxidizing atmosphere whereby said iron sulfate is decomposed into $SO_3$ and $SO_2$, separately recovering said $SO_3$ and $SO_2$ gases from the products of said process and passing said sulfur gases with oxygen from the oxidizing atmosphere present in said fourth step into a chamber sulfuric acid system to transform said sulfur gases into sulfuric acid and recovering separately an iron oxide containing chromium and vanadium values contained in the original titanium-iron ore.

2. The process of claim 1 in which the concentration in said second step is carried out to the point where the sulfuric acid-iron sulfate mono hydrate mixture contains sulfuric acid of a concentration between 65 and 80% $H_2SO_4$, cooling said mixture to crytallize out mono hydrated iron sulfate, separating said mono hydrated iron sulfate from said 65 to 80% sulfuric acid, and submitting said separated mono hydrated iron sulfate without removing therefrom the mechanically adhering free sulfuric acid to the Steps 3 and 4 of the process of claim 1.

3. The process of claim 1 in which the first step is carried out in a vertical tower in which said waste acid and carbonaceous combustion gases are flowing in counter-current, the second step is carried out in a rotary furnace heated by carbonaceous combustion gases which, after passing through said rotary furnace, are passed to said vertical tower.

4. The process of claim 1 in which said Steps 3 and 4 are carried out in two distinct rotary furnaces, the last of which is heated by means of sulfur combustion gases, which gases are mixed with the $SO_3+SO_2$ gases produced by the decomposition of said oxidized iron sulfate, and said combined gases are passed into a chamber sulfuric acid system for conversion into sulfuric acid.

5. A process for the recovery of valuable products from waste dilute, impure sulfuric acid and crystallized copperas by-products obtained in the manufacture of titanium compounds from titanium ores, comprising initially concentrating to a point of substantial saturation an iron sulfate-waste sulfuric acid solution, increasing the iron content of said initially concentrated solution by adding by-product copperas thereto, further concentrating said solution to a point where the iron sulfate content thereof becomes dehydrated to the monohydrated iron sulfate state and said iron sulfate crystallizes out of solution, subjecting the sulfuric acid-monohydrated sulfate mixture remaining to oxidation under a temperature not to exceed substantially 300° C., recovering the acid distillate and solid oxidized iron sulfate therefrom, decomposing said oxidized iron sulfate in an oxidizing atmosphere and under a temperature of at least 700° C., recovering $SO_2$ and $SO_3$ gases as a result of iron sulfate decomposition, and passing said gases, together with oxygen, into a sulfuric acid chamber system for recovery of sulfuric acid therefrom.

FORD H. McBERTY.